(12) United States Patent
Coumert et al.

(10) Patent No.: US 10,338,358 B2
(45) Date of Patent: Jul. 2, 2019

(54) OPTICAL ZOOM WITH MOVABLE PUPIL

(71) Applicant: THALES, Courbevoie (FR)

(72) Inventors: Bruno Coumert, Saint Heand (FR); Florence Maneval, Saint Etienne (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/843,903

(22) Filed: Dec. 15, 2017

(65) Prior Publication Data

US 2018/0172962 A1 Jun. 21, 2018

(30) Foreign Application Priority Data

Dec. 20, 2016 (FR) ..................... 16 01807

(51) Int. Cl.
*G02B 9/08* (2006.01)
*G02B 15/14* (2006.01)
*G02B 27/00* (2006.01)
*G02B 15/177* (2006.01)

(52) U.S. Cl.
CPC ........... *G02B 15/14* (2013.01); *G02B 15/177* (2013.01); *G02B 27/0012* (2013.01); *G02B 27/0025* (2013.01)

(58) Field of Classification Search
CPC .. G02B 15/177; G02B 15/14; G02B 13/0045; G02B 13/006; G02B 15/167; G02B 23/2438; G02B 27/0025; G02B 5/005; G02B 9/08; H04N 5/2254
See application file for complete search history.

(56) References Cited

U.S. PATENT DOCUMENTS

| 3,918,798 | A | 11/1975 | Takano |
| 7,499,226 | B2 * | 3/2009 | Takato ................. G02B 15/173 359/690 |
| 7,982,975 | B2 * | 7/2011 | Takato ................. G02B 23/243 359/754 |
| 9,097,850 | B2 * | 8/2015 | Sone ........................ G02B 9/14 |
| 2007/0258150 | A1 | 11/2007 | Takato |
| 2009/0135497 | A1 | 5/2009 | Nagahara et al. |
| 2010/0020410 | A1 | 1/2010 | Nanjo et al. |

(Continued)

OTHER PUBLICATIONS

D. Doering et al., "Zoom lens design for projection optics," Proceedings of SPIE, vol. 9626, Optical Systems Design 2015, pp. 962617-1-962617-11.

*Primary Examiner* — William R Alexander
*Assistant Examiner* — Balram T Parbadia
(74) *Attorney, Agent, or Firm* — Baker & Hostetler LLP

(57) ABSTRACT

An optical zoom including a movable pupil that moves according to a movement law, comprises four successive groups of lenses, the first group and the fourth group being fixed, the second group and the third group being movable and placed between the first and fourth groups, the second group being a convergent group and the third group being a divergent group. In a first variant, the diameter of the movable pupil varies according to a variation law, depending on the movement law of the movable pupil. In a second variant, the optical zoom includes a movable stop, the movable stop moving according to a second movement law, the diameter of this stop varying according to a second variation law, depending on the second movement law of the movable stop.

4 Claims, 4 Drawing Sheets

(56) References Cited

U.S. PATENT DOCUMENTS

| | | | | |
|---|---|---|---|---|
| 2011/0013290 A1* | 1/2011 | Shigemitsu | .......... | G02B 13/003 |
| | | | | 359/717 |
| 2011/0304921 A1 | 12/2011 | Nagahara | | |
| 2013/0250160 A1 | 9/2013 | Neil | | |
| 2016/0202448 A1* | 7/2016 | Okada | .................... | G02B 7/102 |
| | | | | 359/684 |

* cited by examiner

OPTICAL ZOOM WITH MOVABLE PUPIL

CROSS-REFERENCE TO RELATED APPLICATIONS

This application claims priority to foreign French patent application No. FR 1601807, filed on Dec. 20, 2016, the disclosure of which is incorporated by reference in its entirety.

FIELD OF THE INVENTION

The field of the invention is that of imaging objectives, and more precisely, that of optical zooms. By optical zoom what is meant is an optic in which the field variation is achieved optically and not electronically.

BACKGROUND

A zoom generally possesses a plurality of optical subassemblies called "elements", certain of which are fixed and others of which are movable along the optical axis of the system. A conventional zoom architecture comprises a plurality of optical elements:

a fixed first element that allows an image, which is most often virtual, of the observed object to be formed, which image is received by a second element;

movable second and third elements that allow the focal length of the zoom to be varied and a constant image back focus to be preserved when the focal length is varied; and a fixed fourth element that receives the image formed by the preceding elements and forms it in the plane of a film or sensor, which may be a digital sensor for example.

In the case of a mechanically compensated zoom, the movements of the second and third elements follow independent complex laws in order to ensure the clearness of the focal plane whatever the value of the focal length.

The aperture of the zoom, which governs the amount of light received, is dictated by the diameter of the pupil. In conventional designs, the pupil, generally embodied by an iris of variable diameter, often has a fixed position and is then located either between the third and fourth elements or indeed in the interior of the fourth element. The exit pupil therefore occupies a fixed position, whereas the entrance pupil moves along the optical axis and has a diameter that varies depending on the focal length of the zoom.

Thus, during a change in focal length, i.e. when the third and second elements are moved, the useful diameters of the lenses located between the third element and the image plane remain constant whereas they vary for the lenses located between the third element and the front of the zoom.

Field aberrations such as coma, astigmatism or distortion depend on the position of the pupil and hence said position is also a degree of freedom for optimisation of the zoom.

Zooms of this type work over a wide range of focal lengths referred to as their "range" and often possess front optics of large diameter that are both tricky to produce, expensive and may increase the weight of and unbalance the zoom. Certain solutions or certain compromises already exist for decreasing the diameters, weights and cost of the optical components in a zoom. The following compromises may in particular be made: the "range" of the zoom may be decreased, focal lengths increased, aperture decreased, the aperture allowed to vary as a function of the position of the zoom in its range or "to ramp" but these compromises are necessary to the detriment of final performance.

For a given aperture number N, the diameter of the entrance pupil (D may be written as a function of the focal length F:

$$N = F/\Phi \text{ or } \Phi = F/N$$

The size of an optic depends on the size of the pupil and on the distance to the pupil. When the pupil is far away, large fields lead to optics of significant dimensions.

In the case of very long focal lengths, the diameter of the front optics is governed by the aperture. It is optionally possible to tolerate "ramping" i.e. vignetting of the beam on the axis at long focal lengths in order to seek to minimise the diameter of the front optics.

In the case of systems of very short focal length, the diameter of the front optics mainly depends on the axial position of the entrance pupil of the objective and, of course, on the value of the field. According to the above relationship, the pupil diameter, which is small in this configuration, has relatively little influence.

An optical architecture that allows the entrance pupil to be as close as possible to the front lenses is therefore desirable. This may be obtained, for example, by moving the first element so that it remains in proximity to the entrance pupil of the system when the focal length of the system is varied. This solution has in particular been presented by the company "Carl Zeiss" in the publication entitled "Zoom lens design for projection optics", Proceedings of SPIE volume 9626, 962617. It describes an example zoom that possesses a divergent movable first element, followed by a convergent movable second element and a fixed third element. The pupil of the system is fixed and is located at the entrance of the third element. By moving the first two elements, it has been observed that it is possible to preserve front optics of reasonable diameters.

Nevertheless, such a method turns out to be effective above all for zooms having a low range and quickly becomes ineffective for high ranges. Moreover, this solution is rarely envisaged for reasons of aesthetics and because of problems with seal tightness that this may sometimes occasion, the zoom not working at constant volume. Furthermore, the translation of the first element or of a module internal to this first element is generally used to focus on nearby objects because the movement laws are then independent of the focal length of the zoom.

Document US2013250160 entitled "Zoom lens with forward-located aperture stop" proposes a solution composed of four groups of lenses:

a divergent fixed first group;

a movable pupil located between the first and second groups;

a convergent movable second group;

a convergent movable third group and a fourth group that is very slightly convergent.

This publication shows that the fact of positioning a movable pupil between the two first elements and of allowing it the freedom to follow its own movement law makes it possible to limit the diameters of the front and back optics. This method guarantees that the ratio of the diameters of the largest lens and of the smallest lens of the system does not exceed a ratio of two. Such a system is also effective only for zooms having reasonable zoom ranges, because although it allows the diameter of the front optics to be decreased, it leads to a significant increase in the diameters of the lenses of the second and third elements. For large focal-length ranges, the diameters of the lenses of the intermediate groups may become larger than those of the first element.

The second obstacle limiting the rays after the pupil is the stop. Architectures comprising two movable diaphragms have been described in the literature. Mention will be made, for example, of U.S. Pat. No. 3,918,798 entitled "Zoom lens having two diaphragms", which describes an optical architecture of this type.

Another of the drawbacks of the latter type of solutions is that the movement of the pupil leads to changes in the aperture of the zoom, which are undesirable.

SUMMARY OF THE INVENTION

The zoom according to the invention does not have these drawbacks. More precisely, the subject of the invention is an optical zoom including a movable pupil that moves according to a movement law, characterised in that the zoom includes four successive groups of lenses, the first group and the fourth group being fixed, the second group and the third group being movable and placed between the first and fourth groups, the second group being a convergent group and the third group being a divergent group.

Advantageously, the diameter of the movable pupil varies according to a variation law, depending on the movement law of said movable pupil.

Advantageously, the optical zoom includes a movable stop, said movable stop moving according to a second movement law, the diameter of this stop varying according to a second variation law, depending on the second movement law of said movable stop.

Advantageously, during the movements of the movable pupil and the movable stop, the variations in the diameter of the pupil and of the stop are such that beyond a certain movement, the pupil becomes the stop and the stop becomes the pupil.

Advantageously, for a given zoom focal length, the position of the pupil is the position that minimises the largest field aberration at said focal length.

Advantageously, for the long focal lengths of the zoom, the position of the pupil is the position that minimises coma and for the short focal lengths of the zoom, the position of the pupil is the position that minimises astigmatism and/or field curvature.

Advantageously, the pupil being a metal iris, the movements and variations of this iris are ensured by first systems of cams coupled with second cam systems actuating the movements of the movable optical elements of the zoom.

BRIEF DESCRIPTION OF THE DRAWINGS

The invention will be better understood and other advantages will become apparent on reading the following description, which is nonlimiting, and by virtue of the appended figures, in which.

DETAILED DESCRIPTION

Figure 1:
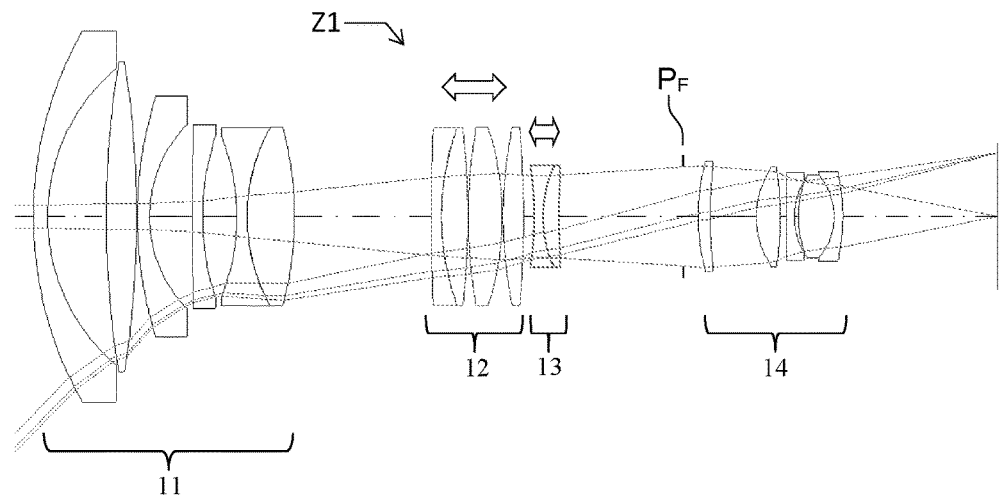
FIGS. 1 and 2 show a prior-art zoom.

The zoom according to the invention possesses four groups of lenses, which groups are called "elements" and are successively numbered from 1 to 4, the element 1 being located at the entrance of the zoom and the element 4 at the exit closest to the focal plane. The element 1 of said zoom is fixed and its position depends on focal length; the elements 2 and 3 are movable. These elements 2 and 3 are convergent and divergent, respectively. They allow the focal length of the zoom to be varied while preserving a fixed image plane. The element 4 is a fixed convergent element.

The zoom includes a movable pupil that is embodied by an iris the diameter of the aperture of which may be made to vary via a mechanical action. This iris may be located in the element 2 of the zoom, between its element 2 and its element 3, in its element 3 or between its element 3 and its element 4. The diameter of this iris is adjusted depending on the position that it occupies in the system. It is thus possible to keep the aperture of the system constant when the iris is moved.

By moving this iris, and by adjusting its diameter, the characteristics and performance of the zoom are improved with respect to a zoom of fixed iris. Thus, it is possible:

to decrease the diameters of the front lenses of the element 1;

decrease their manufacturing cost; and decrease the total weight of the system.

Moreover, the movement of the pupil allows an additional calculational parameter to be varied in the optimisation of the optical assembly, and will enable a better correction of the aberrations of the system, and therefore a better imaging quality, since field aberrations depend on the position of the pupil.

A variation in the diameter and a movement of a stop located upstream of the movable iris and/or a variation in the diameter and a movement of a stop located downstream of the movable iris may be associated with the movement of said iris. This movable stop allows vignetting to be optimally controlled so as to decrease transverse aberrations in the image plane and to limit the loss of brightness between the field centre and field edge. This control, which depends on the focal length of the zoom, makes it possible to maintain the aperture of the zoom by acting only on field rays.

The pupil may thus pass from one element to another or through a given element when the focal length of the system is varied. Although it is mechanically difficult to move an iris from the other side of a group of lenses, it is in contrast possible, during the movement of the elements 2 and 3, for a stop that is the cause of vignetting of the optical beam in the field, to be converted, in its turn, into a pupil limiting the beam on the axis. By permitting such a pupil movement from one element to another, it is possible to substantially increase the total range of movement of said pupil.

By way of an example embodiment, two zooms the optical characteristics of which are equivalent but the first zoom Z1 of which has a fixed pupil $P_F$ and the second zoom Z2 of which has a mobile pupil $P_M$ according to the invention, will be compared. In these two configurations, the focal length of the zooms varies between 15 mm and 40 mm and their aperture is F/2.6.

Figure 2:
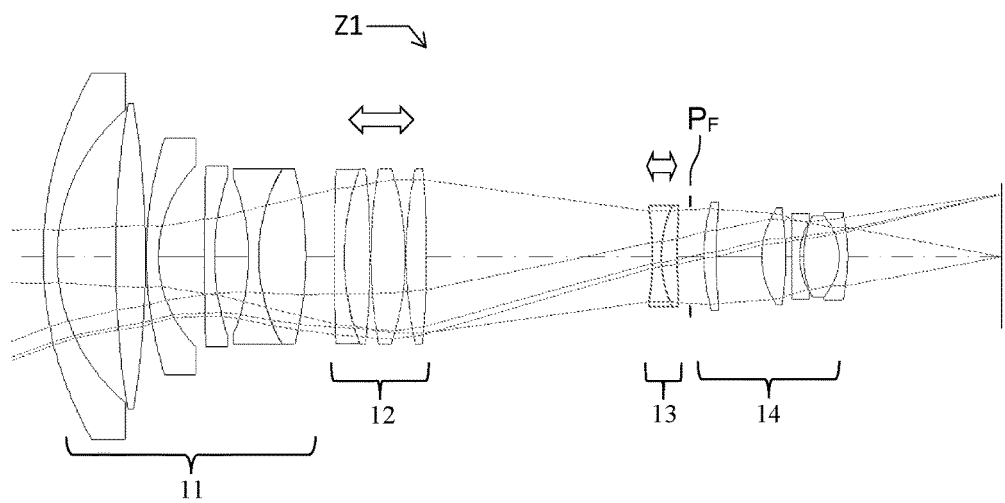

The zoom Z1 shown in FIGS. 1 and 2 includes a divergent fixed element 11, a convergent movable element 12, a divergent movable element 13 and a convergent fixed element 14. The pupil $P_F$ is fixed and located between the element 13 and the element 14.

In FIG. 1, this zoom Z1 is shown in a configuration in which the positions of the elements 12 and 13 allow a short focal length to be obtained. In FIG. 2, this zoom Z1 is shown in a configuration in which the positions of the elements 12 and 13 allow a long focal length to be obtained.

The front lenses of the element 11 are of larger diameter than that of the lenses located at the back of the zoom. Moreover, the useful zones of these front lenses are of maximum size at the short focal length, as may be seen in FIG. 1, the useful zones being the areas of each dioptric interface that are struck by light rays.

Figure 3:
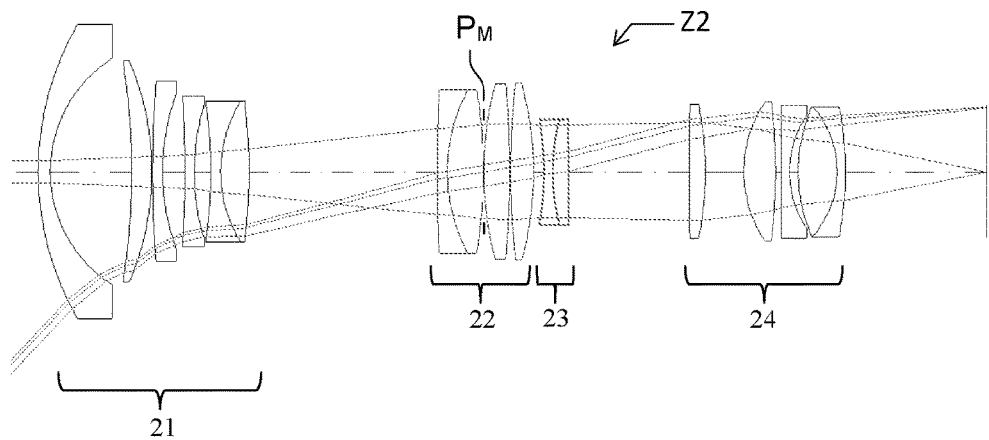
FIGS. 3 and 4 show a zoom with a movable pupil according to the invention.
Figure 4:
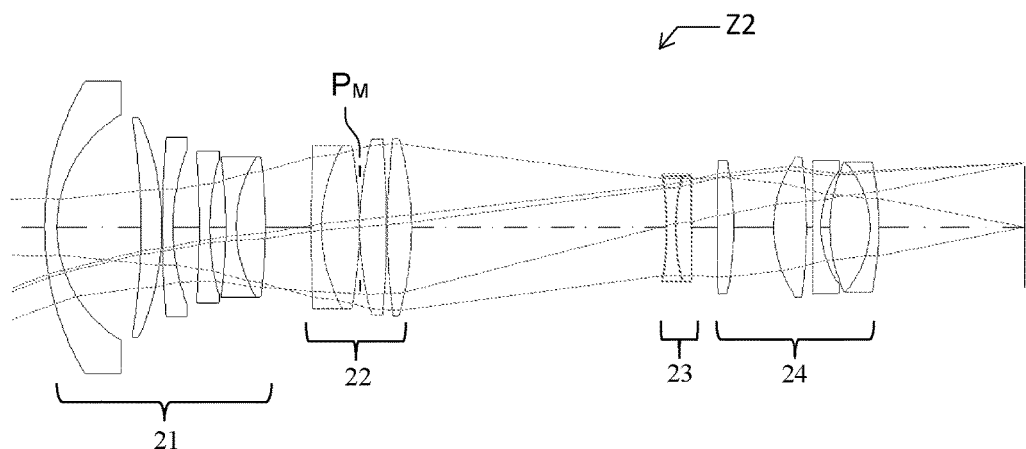

The zoom Z2 shown in FIGS. 3 and 4 includes a divergent fixed element 21, a convergent movable element 22, a divergent movable element 23 and a convergent fixed element 44. The pupil $P_M$ is movable.

In FIG. 3, this zoom Z2 is shown in a configuration in which the positions of the elements 22 and 23 allow a short focal length to be obtained. In FIG. 4, this zoom Z2 is shown in a configuration in which the positions of the elements 22 and 23 allow a long focal length to be obtained.

This zoom Z2 was calculated by taking as starting base the zoom Z1 and possesses, contrary to the latter, a movable pupil $P_M$ of variable diameter that is located in the interior of the element 22. In this example, the movement of the pupil respects the same movement law as the element 22. Moreover, this zoom was calculated on the basis of the same properties as the fixed-pupil zoom Z1 in FIGS. 1 and 2, i.e. its focal lengths, its image format, its length, its distortion and its modulation transfer function or "MTF" are identical or similar to those of the zoom Z1.

The movement of the iris makes it possible to obtain an entrance pupil closer to the lenses making up the element 1, in particular, in the case of a fixed iris. Specifically, the entrance pupil of the zoom Z1 is located at 44 mm from the first dioptric interface, whereas the entrance pupil of the zoom Z2 is located at 36 mm from the first dioptric interface.

At short focal length, the two zooms possess a large field. The diameter of the first lenses therefore essentially depends on the position of the entrance pupil. Thus, in the fixed-iris arrangement of the zoom Z1, the first lens possesses a diameter of 87 mm, whereas in the movable-iris optical arrangement of the zoom Z2, this diameter is decreased to 67 mm.

By decreasing the diameters of the lenses of the zoom Z2, the weight of the zoom Z2 is also decreased by about 45% with respect to the weight of Z1. Specifically, the first zoom has a weight of about 700 grams whereas the second zoom has a weight of about 400 grams. This moreover allows the overall cost of manufacture of the lenses to be decreased.

By moving the iris, the exit pupil of the system is also moved, in the same movement direction as the iris. In the above example, it may be seen that the lenses of the back group of the zoom Z2 possess a larger diameter in the movable-iris solution, since the exit pupil is further away from the image plane. However, the advantage of this solution is that the configuration of the zoom Z2 is closer to the conditions required for telecentricity, i.e. an exit pupil located at infinity. This configuration allows angles of incidence on the detector to be obtained that are independent of the field and therefore guarantees a more uniform response.

One of the other advantages of the movable-pupil zoom configuration is that it allows a better optimisation of the optical assembly.

Figure 5:
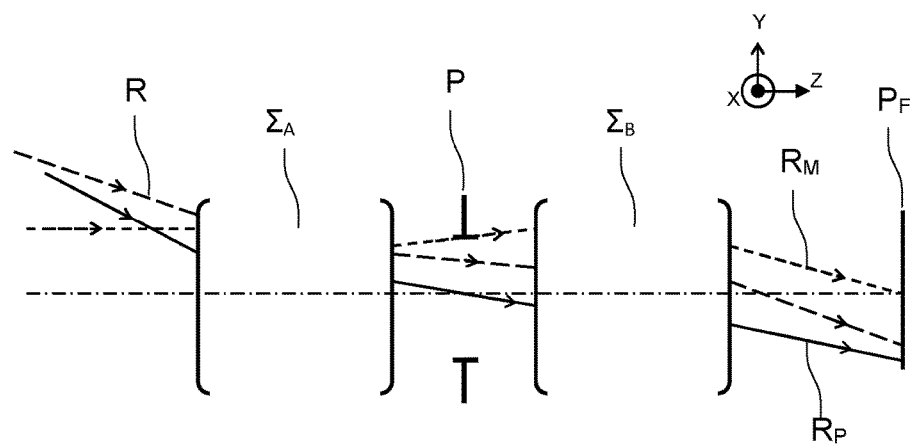
FIGS. 5, 6 and 7 show the propagation of light rays in an optical system including a plurality of modules.
Figures 6, 7:
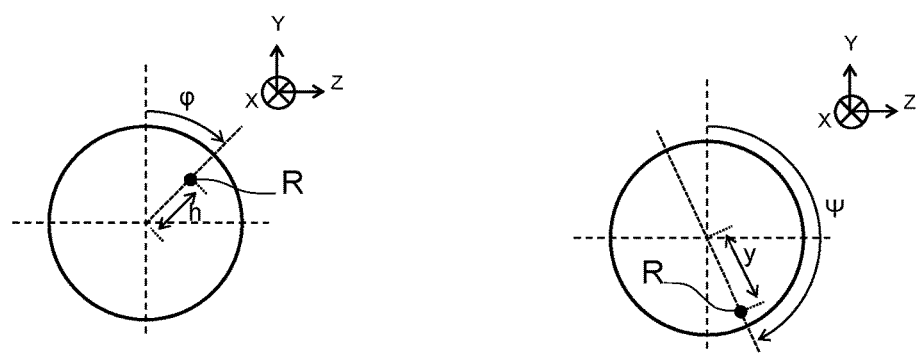

The optical system of FIGS. 5, 6 and 7 is composed of two optical subassemblies or "modules" referenced $\Sigma_A$ and $\Sigma_B$ in a coordinate system (x, y, z) as indicated in FIG. 5. The focal plane of the assembly made up of the two modules is denoted $P_F$. In the intermediate optical space that is located between these two optical modules, the pupil P may be real or virtual, mechanical or non-mechanical. The light ray $R_M$ represents the marginal ray of the on-axis field. It is represented by lines of short dashes in FIG. 5. The light ray $R_P$ represents the chief ray of the maximum field. It is represented by solid lines. The light ray R represents a given light ray, for an intermediate field and an intermediate angular aperture. It is represented by lines of long dashes.

With monochromatic light, optical path difference, which represents the departure of the wavefront of the optical system from the ideal case, may be written in the form of Seidel sums:

$$\Delta(h,y,\varphi,\psi) = S_I \cdot h^4 + S_{II} \cdot h^3 y \cdot \cos(\varphi-\psi) + S_{III} \cdot h^2 y^2 \cdot \cos(2(\varphi-\psi)) + S_{IV} \cdot h^2 y^2 + S_V \cdot h y^3 \cdot \cos(\varphi-\psi)$$

where h is the normalised angular aperture of the given ray, y is its normalised radial field, $\varphi$ its orthoradial angle of azimuth in the pupil and $\psi$ its angle of azimuth in the field as shown in FIGS. 6 and 7. The coefficients $S_I$, $S_{II}$, $S_{III}$, $S_{IV}$, and $S_V$ respectively represent spherical aberration, coma, astigmatism, field curvature and the distortion of the system in its image space.

In the case of polychromatic light, the aberration referred to in French as le chromatisme de grandeur apparente, i.e. lateral chromatic aberration after the light has passed through a pupil placed before the lens, generally depends on the position of the pupil. Thus, for a single lens, if the pupil coincides with the lens, this aberration obviously disappears.

Figure 8:
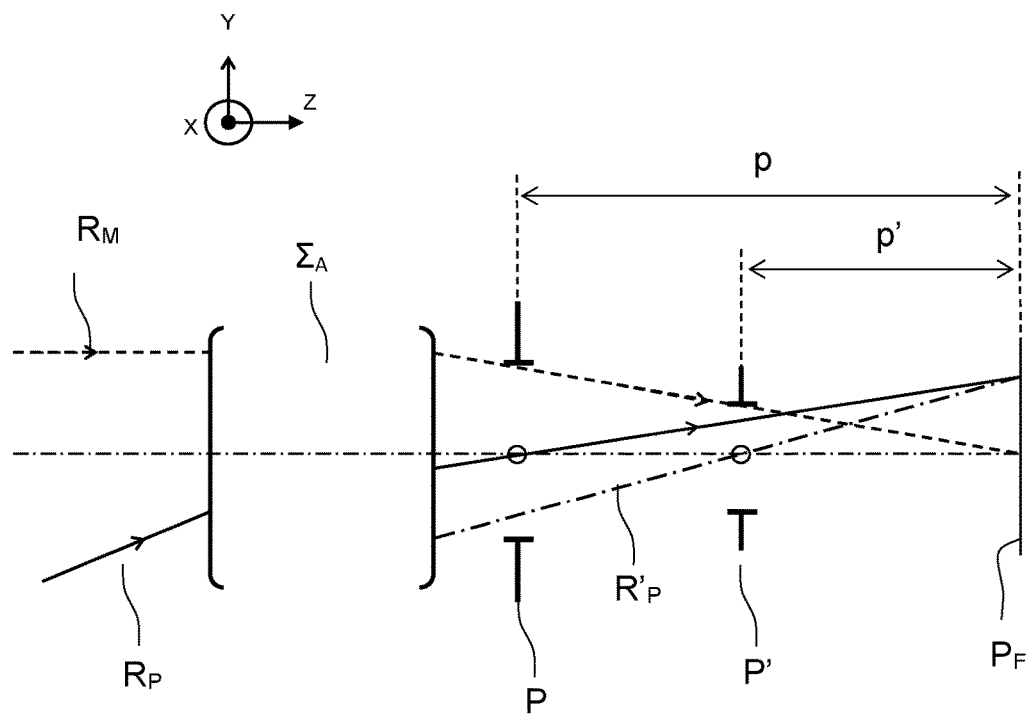
FIG. 8 shows the consequences of a pupil movement on the aberrations of an optical system.

FIG. 8 illustrates a pupil movement in a system $\Sigma$ according to the invention, in a coordinate system (x, y, z). In this figure, the distances p and p' represent the positions P and P' of the exit pupil in the image space, respectively before and after movement of said pupil. The light ray $R_M$ represents the marginal ray of the on-axis field. It is represented by lines of short dashes in FIG. 8. The light ray $R_P$ represents the chief ray of the maximum field. It is represented by solid lines. It passes through the centre of the pupil P. In FIG. 8, this point of intersection with the centre of the pupil is represented by a circle.

It has been demonstrated that when the pupil of the system is moved, while preserving the same aperture, i.e. while working at constant Lagrange invariant, the amplitudes of certain aberrations will vary. These variations in aberrations are dependent on the amplitude of the movement of the pupil and on residual aberrations of the system in its image space, and are equal, to a first approximation, to:

$$\Delta S_I = 0$$

$$\Delta S_{II} = -4 S_I \cdot \Delta\left(\frac{1}{p}\right)$$

$$\Delta S_{III} = -S_{II} \cdot \Delta\left(\frac{1}{p}\right) + 2 S_I \cdot \Delta^2\left(\frac{1}{p}\right)$$

$$\Delta S_{IV} = -2 S_{II} \cdot \Delta\left(\frac{1}{p}\right) + 4 S_I \cdot \Delta^2\left(\frac{1}{p}\right) = 2 \cdot \Delta S_{III}$$

$$\Delta S_V = -2(S_{III} + S_{IV}) \cdot \Delta\left(\frac{1}{p}\right) + 3 S_{II} \cdot \Delta^2\left(\frac{1}{p}\right) - 4 S_I \cdot \Delta^3\left(\frac{1}{p}\right)$$

with $$\Delta^n\left(\frac{1}{p}\right) = \left(\frac{1}{p'} - \frac{1}{p}\right)^n.$$

The variations $\Delta S_J$ depend on the residual aberrations $S_I$, $S_{II}$ ... $S_{J-1}$. $\Delta S_I$, $\Delta S_{II}$, $\Delta S_{III}$, $\Delta S_{IV}$ and $\Delta S_V$ respectively represent the variations in spherical aberration, coma, astigmatism, field curvature and distortion of third order when the exit pupil is moved by an amount equal to the difference between p' and p.

When the pupil is moved, the trace of the marginal ray remains unchanged if the pupil is moved without modifying the aperture of the system. In contrast, when the exit pupil is moved from P to P', then the chief ray $R_P$ also moves to $R'_P$ and the field aberrations are modified as a result.

The optical path difference after the pupil has been moved may therefore be written:

$$\Delta(h, y, \varphi, \psi) = (S_I + \Delta S_I) \cdot h^4 +$$
$$(S_{II} + \Delta S_{II}) \cdot h^3 y \cdot \cos(\varphi - \psi) + (S_{III} + \Delta S_{III}) \cdot h^2 y^2 \cdot \cos(2(\varphi - \psi)) +$$
$$(S_{IV} + \Delta S_{IV}) \cdot h^2 y^2 + (S_V + \Delta S_V) \cdot hy^3 \cdot \cos(\varphi - \psi).$$

From these formulae it may be seen that a pupil movement, although it does not allow the residual aberrations of the system to be corrected, nevertheless allows aberrations in the field to be balanced to a certain extent, given that this movement does not change spherical aberration, which is the only geometric aberration present on the axis of the system.

There are also iris positions, which are a priori separate, that allow a choice of the aberrations of coma, astigmatism, curvature or residual distortions to be cancelled out. For example, in a given configuration, if the optical system has a residual spherical aberration $S_I$ and a residual coma $S_{II}$, it is possible to cancel out this residual coma $S_{II}$ by moving the pupil by an amount p' such that:

$$\Delta S_{II} = -S_{II} = -4S_I \cdot \left(\frac{1}{p'} - \frac{1}{p}\right)$$

i.e. such that:

$$p' - p = \frac{4p \cdot S_I}{p \cdot S_{II} + 4S_I} - p$$

This particularity may advantageously be exploited in the case of an optical zoom. Specifically, in a fixed-iris optical zoom a variation in the field aberrations is generally observed when the element 2 and the element 3 are moved, i.e. when the focal length is changed.

Thus, aperture aberrations, i.e. mainly spherical aberration and coma, are typically observed at the long focal length and field aberrations, i.e. astigmatism, curvature and distortion, are typically observed at the short focal length. Thus, a controlled iris movement allows the residual aberrations of the system to be significantly decreased. It is thus advantageously possible to choose an iris position that minimises coma at long focal lengths, and another iris position that minimises astigmatism and field curvature at short focal lengths.

By extrapolating this method for each focal length, it is therefore possible to calculate the iris position that minimises aberrations in the field and to deduce therefrom a movement law specific to the iris. Its diameter must, for its part, be calculated so as to preserve an aperture that remains constant as a function of the focal length of the system.

The invention claimed is:

1. An optical zoom including a movable iris pupil that moves according to a movement law, wherein the zoom includes:
   four successive groups of lenses, the first group and the fourth group being fixed, the second group and the third group being movable and placed between the first and fourth groups, the first group being a divergent group, the second group being a convergent group, the third group being a divergent group, and the fourth group being a convergent group,
   the iris being located in the second group or between the second group and the third group or in the third group or between the third group and the fourth group, the diameter of the iris varying according to a variation law, depending on the movement law of the movable pupil so as to preserve a constant aperture,
   a movable stop, said movable stop moving according to a second movement law, the diameter of this stop varying according to a second variation law, depending on the second movement law of said movable stop, and
   wherein during the movements of the movable pupil and the movable stop, the variations in the diameter of the pupil and of the stop are such that beyond a certain movement, the pupil becomes the stop and the stop becomes the pupil.

2. The optical zoom according to claim 1, wherein, for a given zoom focal length, the position of the pupil is the position that minimises the largest field aberration at said focal length.

3. The optical zoom according to claim 2, wherein, for the long focal lengths of the zoom, the position of the pupil is the position that minimises coma and for the short focal lengths of the zoom, the position of the pupil is the position that minimises astigmatism and/or field curvature.

4. The optical zoom according to claim 1, wherein the movements and variations of the movable iris are ensured by first systems of cams coupled with second cam systems actuating the movements of the movable optical elements of the zoom.

* * * * *